Feb. 12, 1952        J. W. ROBINS        2,585,347
CONTROLLER

Filed Feb. 28, 1950                          3 Sheets-Sheet 1

Inventor:
JOHN W. ROBINS
By
Attorney

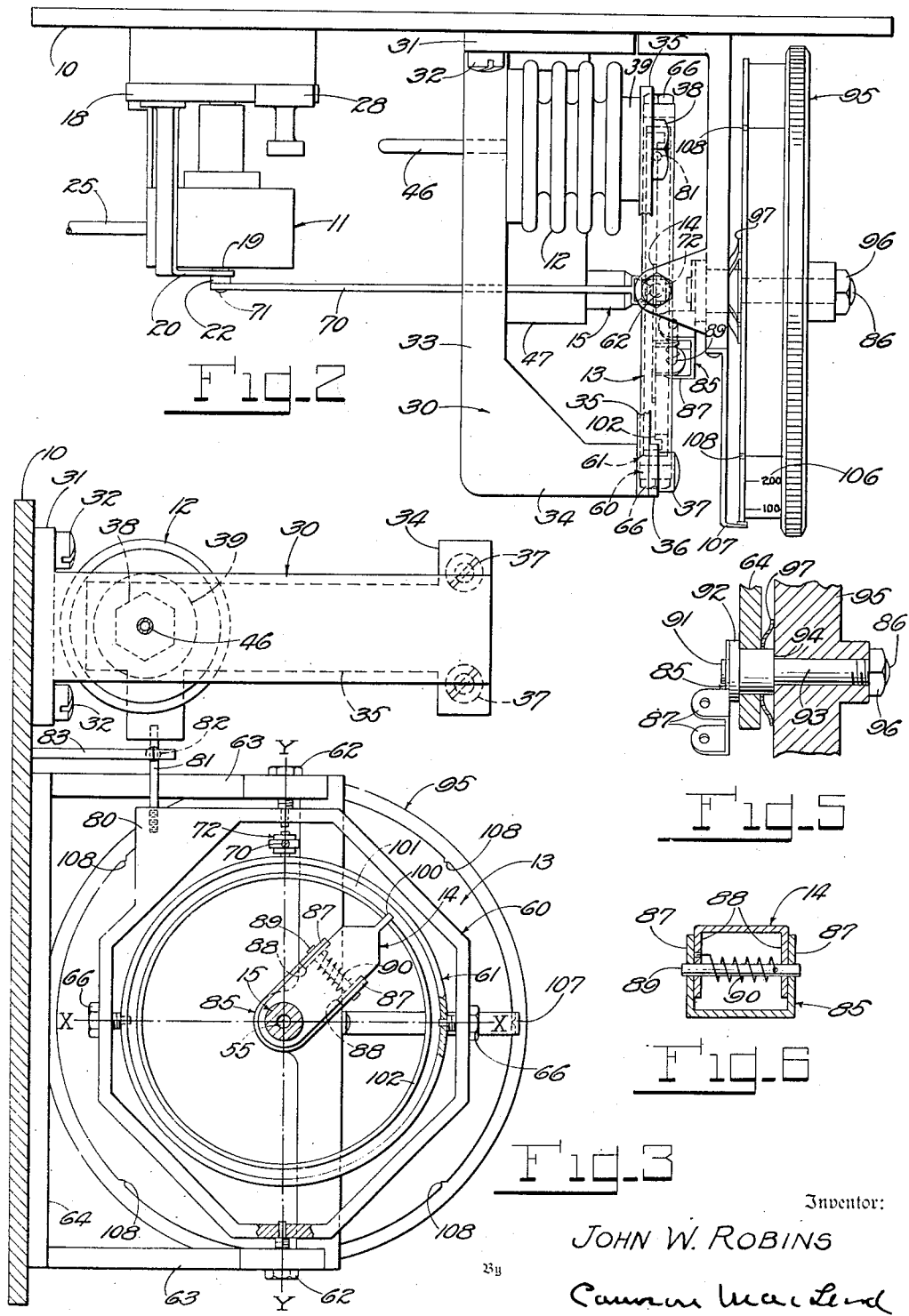

Feb. 12, 1952 J. W. ROBINS 2,585,347
CONTROLLER
Filed Feb. 28, 1950 3 Sheets-Sheet 3
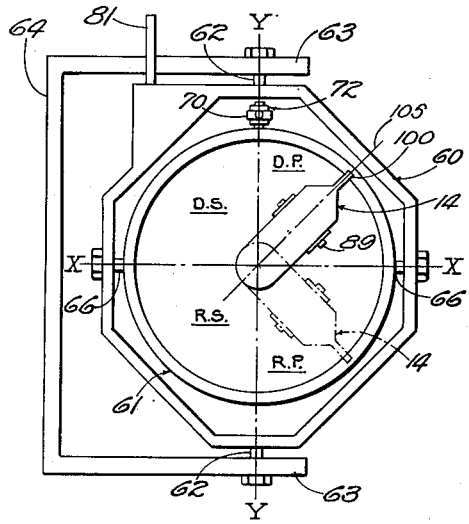
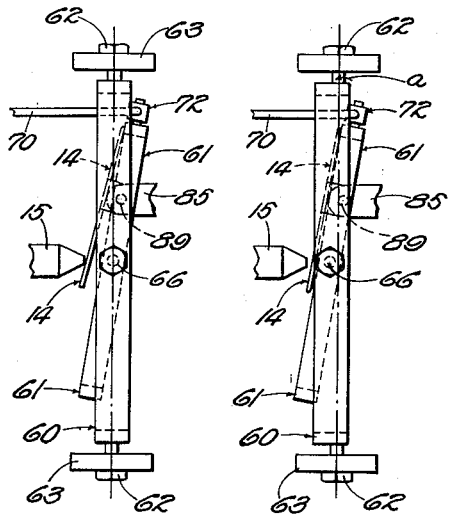
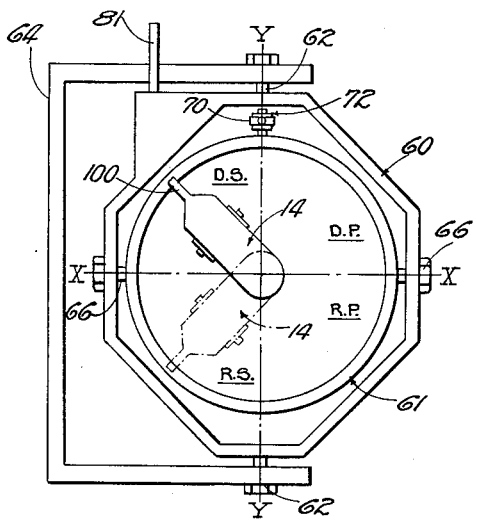
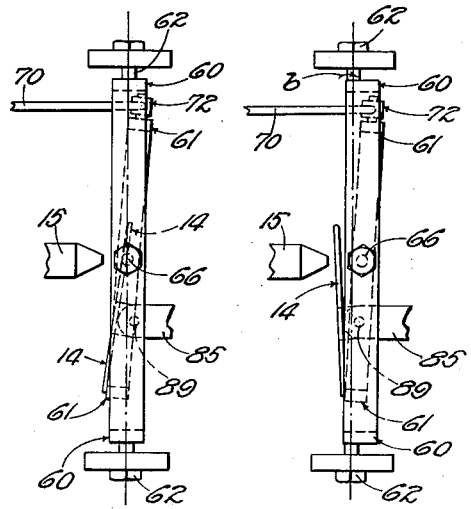
Inventor:
JOHN W. ROBINS
By
Cameron MacLeod
Attorney Patented Feb. 12, 1952

2,585,347

UNITED STATES PATENT OFFICE 2,585,347

CONTROLLER

John W. Robins, Westwood, Mass., assignor to Mason-Neilan Regulator Company, Boston, Mass., a voluntary association of Massachusetts Application February 28, 1950, Serial No. 146,699

17 Claims. (Cl. 137—153)

This invention relates to controllers for maintaining a variable, such as pressure, temperature, level, rate of flow or the like, substantially at a desired value by governing the rate of application of an agent for affecting the variable value. More particularly, this invention is concerned with controllers wherein fluid pressure is utilized and varied to a pressure operated servomotor on a selected basis which variation is proportional to the change in the variable value, the controller herein disclosed being arranged and constructed for use in connection with a compressible operating fluid such as air or an equivalent medium.

Controllers with which this invention is primarily concerned customarily employ a valve, such as a control couple in the form of a nozzle and flapper, to vary the fluid pressure in the system, the flapper and/or nozzle being relatively positioned by the joint action of a primary element, responsive to a change in the value of the variable, and of a so-called feed back element, responsive to the change in fluid pressure initiated by the primary element, whereby the initial pressure change is modified to provide a throttling range or proportioning band to the controller. In order to effect the aforesaid action, means directly responsive to the movements of the primary and feed back elements must be provided to vary the relative position of the nozzle and flapper, and inasmuch as extremely delicate movements are involved, lost motion and friction must be substantially eliminated if accurate control is to be obtained, and since the width of the proportioning band of the controller is necessarily varied to suit the process conditions, the aforesaid means must include means convenient to the operator for providing a selected width of proportioning band over a wide range of proportionality.

Heretofore, so far as is known to me, one common method of varying the relative position of the nozzle and flapper by the initial and feed back responses has involved the so-called unidirectional principle, wherein the mechanism operates in one direction as a result of the primary response movement and in the opposite direction as a result of the feed back movement, the proportioning band adjustment being obtained by a linkage arrangement suitable for varying the effective movement of one element in respect to the other. In this type of device, the flapper, for example, is moved in one direction by the primary element to close the nozzle and in the opposite direction by the feed back element to open the nozzle. A difficulty with this arrangement is that it may be necessary to increase the output pressure of the controller on a corresponding increase in variable value or to decrease the output pressure on such increase in variable value, and vice versa, depending on the process under control and on other factors such as the use of either a direct acting or reverse acting valve with the controller. And when a unidirectional mechanism is used, either the position of the nozzle or the action of the flapper must be reversed, thereby requiring a mechanical change in a relatively delicate mechanism which must be carefully accomplished and usually is subject to adjustment.

I am also aware that a change in magnitude in the direction of motions has been accomplished by what may be termed right angular motions, whereby the resultant movement remains substantially along the diagonal of a parrallelogram. By rotating the nozzle and flapper about the locus of the pivotal point of the primary response link and the feed back link when the output pressure is at the midpoint, the width of the proportioning band may be varied and both direct and reverse action may also be obtained. However this involves a relatively complicated construction requiring a supply of fluid to be fed to a rotatable nozzle through a rotary bearing.

The controller embodying this invention includes a simple and inexpensive means for effectively operating the control couple in response to movements of the primary and feed back elements without any substantial friction or lost motion, and changes in adjustment may be quickly effected by the operator, against relatively widely spaced indexes on a scale, to provide the exact width of proportioning band required throughout a maximum range of adjustment. And this proportionally adjustment may not only be employed within a direct acting range but also may be used to provide reverse action with corresponding proportionality settings and in addition thereto, to provide so-called snap action in either a direct or reverse acting sense.

This invention broadly consists in the use of two interacting members, generally similar in their construction and function to those employed in a gimbal system, for actuating a valve to vary the output pressure of a controller by the combined motions of primary and secondary responsive elements, and while the nature of their use is somewhat different than in a gimbal system, they may be conveniently termed "gimbals"

for the purposes of this description. As in the usual gimbal system, the gimbals herein disclosed are provided with two intersecting axes and include a first gimbal pivotally mounted on a support and a second gimbal pivotally mounted on the first gimbal, the axis of one of said gimbals being preferably, but not necessarily, normal to that of the other. The valve herein illustrated is in the form of a control couple, namely, a nozzle and flapper, the intersection of the gimbal axes being substantially a locus at which a fixed nozzle is mounted for cooperation with a flapper to vary the fluid pressure in the system. The flapper is carried on a pivotal mounting which may be rotated about the nozzle orifice as a center of radius in a plane coincident with the gimbal axes. By causing the outer end of the flapper to engage the inner gimbal, the flapper assumes a position in respect to the nozzle in accordance with the combined rotary positions of the gimbals, the motion transmitting effect to the flapper of each gimbal depending on the radial position of the flapper in respect to the axis of rotation of each gimbal. Thus when the flapper is rotated to lessen the angle between its longitudinal axis and the pivotal axis of the inner gimbal, thereby correspondingly widening the angle between the flapper axis and the pivotal axis of the outer gimbal, the motion transmitted to the flapper by a given rotation of the inner gimbal is reduced and the motion transmitted to the flapper by an equivalent rotation of the outer gimbal is proportionally increased. And it is apparent that the rotation of the flapper in the opposite direction has the opposite effect. By this means, a maximum range of proportionality variation may be obtained and, as will hereinafter be more fully pointed out, since the proportionality adjustment referred to is obtained in one quadrant of a circle defined by the rotation of the outer end of the flapper, the remaining three quadrants may also be utilized, so that direct proportional action, reverse proportional action, reverse snap action, and direct snap action may be obtained by a simple adjustment.

It will be apparent to those skilled in the art from the following description that while I preferably employ a control couple including a rotatably mounted flapper and a fixed nozzle as a means of simplifying the construction, other forms of couples may be utilized as, for example, a pivotally and rotatably mounted nozzle which cooperates with a fixed flapper, or a rotatably mounted nozzle which cooperates with a flapper either actuated by or a part of the gimbal which is pivotally carried by the other gimbal of the gimbal system.

Accordingly it is an object of this invention to provide means for actuating a fluid valve, normally a control couple, for varying the output fluid pressure of a controller by the joint action of a primary element, responsive to a change in the value of a variable, and a secondary element, responsive to a change in fluid pressure initiated by the primary element, with a minimum of lost motion and/or friction.

It is an object of this invention to provide means, forming a part of the aforesaid means, for providing both direct and reverse proportional action together with proportional band settings in either sense from zero to infinity, and in addition thereto, either direct or reverse snap action, including differential adjustments from zero to infinity with no change in parts.

It is an object of this invention to combine the motions of primary and secondary response elements by what may be termed a gimbal movement including a first gimbal pivotally mounted on a support and a second gimbal pivotally mounted on the first gimbal and arranged in operative relation with a suitable valve for varying the output pressure of a controller.

More particularly it is an object of this invention to combine the motions of primary and secondary response elements by what may be termed a gimbal movement which functions around the nozzle as a center, the flapper being rotatably mounted about the nozzle, whereby a maximum range of proportionality and differential adjustments relating to proportional and snap action, respectively, may be obtained.

These and other objects of this invention will be more fully understood from the following description when taken in connection with the accompanying drawings, the novel features thereof being pointed out in the claims.

In the drawings:

Fig. 1 is a front elevation, partly in section, of control mechanism embodying the present invention shown connected with a fluid operated regulating valve;

Fig. 2 is a top plan view, partly broken away, of the control mechanism shown in Fig. 1;

Fig. 3 is a vertical section taken on the line 3—3 of Fig. 1 looking in the direction of the arrows;

Figs. 4, 5 and 6 are structural detail views; and

Figures 1, 4:
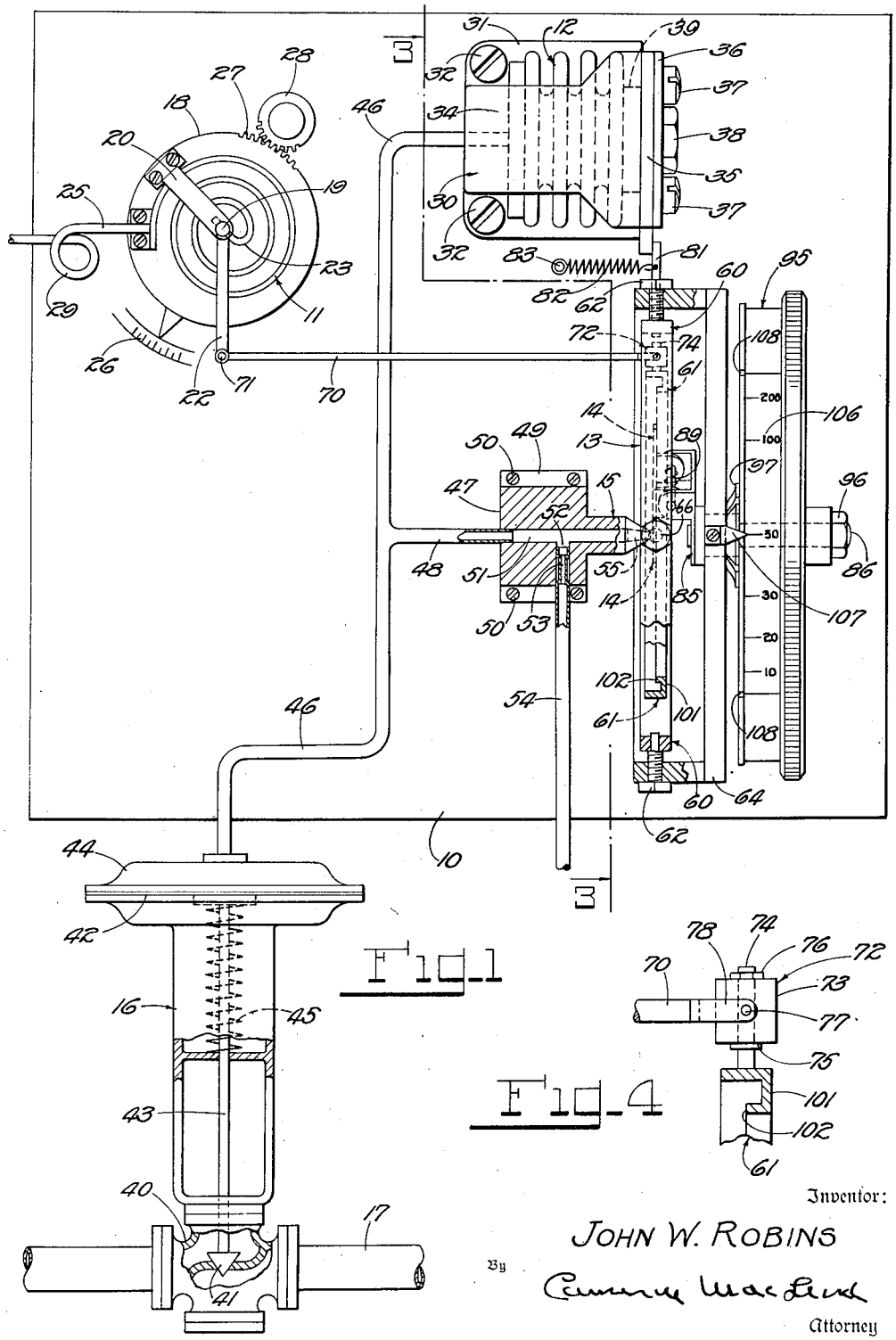

Figs. 7–12, inclusive, are diagrammatic views depicting the operative principles of the mechanism, said views being exaggerated and distorted for the purpose of clarifying the action.

Having reference to the drawings, the control mechanism herein illustrated is shown mounted on a back plate 10 suitable for attachment to the rear wall of an instrument case which has been omitted for the purpose of clarity. The mechanism generally includes a primary response element in the form of a spiral Bourdon coil 11, a secondary response element in the form of a bellows 12, and a gimbal system, generally indicated at 13, together with an associated flapper 14 and nozzle 15 for varying the controller output pressure in accordance with the joint action of the coil 11 and bellows 12. The mechanism is herein shown without a pilot since a pilot is not essential to the present invention, and it will be understood that a pilot of any usual construction may be employed when it is desirable to speed up the control action.

Having reference to Fig. 1, the controller is therein illustrated as arranged to govern the value of a variable, not shown, for example the temperature of a process, by varying the opening of a fluid pressure operated regulating valve 16 which varies the flow of fluid, such as steam, through a pipe as required to maintain the temperature of the controlled process at a predetermined value. For this purpose the primary response element, herein shown as the spiral coil 11 but which may be of any well known construction, is mounted with one end secured to a circular plate 18 which in turn is rotatably mounted on the back plate 10. The spiral coil is provided with a central shaft 19 journalled in the plate 18 at its inner end and at its outer end in an arm 20 which extends radially over the coil and is rigidly attached to the circular plate 18. A motion transmitting arm 22 is secured to the shaft 19 which in turn is in operative connection with the free end 23 of the coil. The fixed end of the coil 11 communicates with capillary tubing 25 which may connect with a temperature responsive bulb, not shown, and is filled with a suitable expansible fluid, the parts being arranged so that on an increase in process temperature, the coil unwinds and rotates the arm 22 counterclockwise as viewed in Fig. 1, and on a decrease in process temperature the opposite occurs. The rotatable circular plate 18 provides means for varying the rotary position of the coil 11, whereby a selected control setting may be obtained on a suitable scale 26, and for this purpose the plate is provided at its periphery with a toothed section 27 which cooperates with a hand operated gear 28, the capillary 25 being provided with a flexible portion 29 to permit the coil to be rotated by the gear to any selected position within the range of control setting adjustment. When the coil is rotated clockwise the temperature setting is raised and vice versa.

The bellows 12 of the secondary response is mounted on a bracket 30, more clearly shown in Fig. 2. The bracket comprises a base 31 secured to the back plate 10 by screws 32, an inwardly extending portion 33 to which one end of the bellows is attached at a point adjacent to the base plate, and an angle arm 34 which generally parallels the base plate and serves to support a leaf spring 35. The leaf spring 35 is rigidly clamped between a block 36 and the end of the angle arm 34 by screws 37 which extend through suitable holes in the block and leaf spring and are threaded into the arm. The free end of the bellows is secured to the free end of the leaf spring 35 by means of a screw 38 which passes freely through a hole in the leaf spring and is threaded into a closure plate 39 with which the bellows is provided. The interior of the bellows is connected to the output pressure system, to be described, and the leaf spring 35 is characterized to provide a selected overall range of bellows movement throughout the output pressure range of change.

The regulating valve 16 may be of any usual construction. It comprises a valve body 40 provided with a direct acting valve member 41 which is in operative connection with a diaphragm 42 by means of a stem 43. The diaphragm 42 defines one wall of a fluid pressure chamber 44 the pressure in which is opposed by a spring 45. The chamber 44 communicates with an output pressure line 46 connecting with a nozzle block 47 through a pipe 48. The output pressure line 46 also connects with the interior of the bellows 12. The nozzle block 47 which includes the nozzle 15, is mounted on a suitable bracket 49 secured to the back plate 10, as by screws 50, and includes a horizontal passage 51 connecting the nozzle with the pipe 48. The passage 51 also connects with a vertical passage 52 including a restriction 53 and serves to connect the nozzle 15 with a suitable source of regulated fluid pressure, not shown, which is supplied through a pipe 54. The nozzle 15 is provided with an orifice 55 having a capacity which is greater than that of the restriction 53 so that the output pressure varies proportionally with changes in the relative throttling position of the nozzle and flapper 14. It will be understood that the bellows 12 of the secondary response may be replaced by any type of pressure responsive element suitable for the purpose, that the regulating valve 16 is herein shown for the purpose of illustration only, and that any suitable type of servomotor for use in connection with the controlled variable may be employed. And while I have shown a regulating valve of the so-called direct acting type, adapted to close on an increase of operating pressure, the control mechanism is equally well adapted for use with a reverse acting valve, designed to close on a decrease in operating pressure, should a valve of the latter type be required by the operating conditions.

In further reference to the regulating valve 16, it is customary to vary the output pressure to the diaphragm 42 over a selected range of pressure change, as for example, a range of 12 pounds, the valve being throttled between the range limits on a basis which is directly proportional to changes in value of the controlled variable. And while it is usual to throttle the flow of fluid through the pipe 17 on the aforesaid proportional basis, it may be desirable, in order to meet the operating requirements, to provide a so-called snap action form of control, that is, the valve is either fully opened or completely closed a selected spread in condition value change between valve opening and closing being provided. And the device embodying my invention is adapted to meet the conditions noted by means of the gimbal system to be described, whereby the output pressure may be made to increase or decrease on a change in condition value in either sense, said increase or decrease being commonly referred to as direct action and reverse action, respectively. Either action together with its proportionality adjustment over a maximum range may be quickly obtained by a simple adjustment which also may be employed to provide both direct snap action and reverse snap action with differential adjustments from zero to infinity.

Referring again to the drawings, the gimbal system 13 comprises interacting outer and inner gimbals 60 and 61, respectively. The outer gimbal 60 which is herein shown as in the general shape of an octagon but which may be in any other suitable form, is arranged to rotate about a pivotal axis Y—Y (Fig. 3) and for this purpose is pivotally mounted at two opposite sides on pivot screws 62 threaded into the rearwardly extending legs 63 of a supporting bracket 64 which is secured to the back plate 10. The inner gimbal 61, preferably in the form of a ring, is pivoted at opposite sides to the outer gimbal by means of screw pivots 65, threaded into the outer gimbal as shown, to provide a pivotal axis X—X. It will be noted that the parts are so arranged that the pivotal axis X—X of the inner gimbal is normal to and bisects the pivotal axis Y—Y of the outer gimbal. Thus the gimbals are free to rotate independently about their individual axes, and in order to effect such independent rotation in response to changes in the value of the variable and in the value of the output pressure of the controller, the parts are preferably arranged so that the inner gimbal 61 is rotated by the spiral coil 11 and the outer gimbal 60 by the bellows 12. And it may be herein pointed out that while it is preferable that the gimbal axes be normal to and bisect each other in order that the gimbal which operates the flapper 14 in a manner to be described, herein shown as the inner gimbal ring 61, may be divided by the axes X—X and Y—Y into four equal quadrants, it is not essential to the operation of the device. The device will function provided the axes intersect within the gimbals at a workable angle other than the 90° angle shown, and in that case it will be clear that zones represented by the four quadrants, which function in a manner to be described, will be unequal, and for that reason are less suitable to the present purpose.

Means for operatively connecting the inner gimbal 61 with the coil 11 is provided by a link 70 which has a pivotal connection 71 with the arm 22 at one end and has a swivel connection, generally indicated at 72, with the gimbal at the other end. The swivel connection 72 comprises a block 73 (Fig. 4) rotatably mounted on a shaft 74 threaded into the outer circumferential surface of the inner gimbal 61 in axial alignment with the pivotal axis Y—Y of the outer gimbal 60 when the outer gimbal axis Y—Y is disposed in the same plane with the inner gimbal axis X—X. The block is retained between a shoulder 75 on the shaft 74 and a snap ring 76 at the outer end of the shaft and is provided with two oppositely disposed pivot pins 77 with which holes in suitably spaced fingers 78 on the link 70 cooperate. Thus the inner gimbal 61 is individually positioned about its pivotal axis X—X in proportional correspondence to the rotary position assumed by the spiral coil arm 22.

The outer gimbal 60 is in operative connection with the free end of the bellows 12 whereby it is individually positioned about its pivotal axis Y—Y in proportional correspondence with the fluid pressure obtaining in the bellows. For this purpose the outer gimbal is provided with an extension 80 (see Fig. 3) to which is threadedly secured an arm 81, disposed in the plane of the gimbal and preferably in parallel with the gimbal axis Y—Y. The arm 81 extends over the leaf spring 35 (see also Fig. 1) and engages the outer surface thereof, a relatively light tension spring 82, attached to the arm and to a post 83 on the back plate 10, serves to maintain the parts in contact. The arrangement is preferably such that when the output pressure is at the midpoint of its operating range, the outer and inner gimbals assume positions in a single plane normal to the axis of the nozzle orifice 55.

The gimbals 60 and 61 are arranged to position the flapper 14 in respect to the nozzle orifice 55 in accordance with the joint action of the spiral coil 11 and bellows 12. The flapper 14 is pivotally mounted on an arm 85 rigidly secured to the inner end of a shaft 86 (see particularly Fig. 5) which is rotatably mounted in the gimbal supporting bracket 64, as shown, with its axis normal to the axes X—X and Y—Y of the gimbal system when the output pressure is at the midpoint, the axis of said shaft passing through their point of intersection. The free end of the arm 85 is provided with spaced lips 87 between which two spaced ears 88 of the flapper (see particularly Fig. 6) are received and pivotally mounted on a pin 89 secured to the ears 87. The flapper is resiliently urged about its pivot against the orifice 55 of the nozzle by means of a coil spring 90 which surrounds the pin 89 between the ears 88 (Figs. 3 and 6) one of the ears being pierced to receive one end of the spring, and the pin being pierced at a point adjacent the opposite ear to receive the other end of the spring. The relative positions of the pivot pin 89 and the orifice 55 of the nozzle are such that the plane of the flapper is within the plane defined by the gimbals when the output pressure is at the midpoint, and therefor the plane of the flapper is normal to the axis of the nozzle 15 when the flapper engages the nozzle orifice. The flapper support arm 85 is provided with an opening suitable to receive a reduced portion 91 at the inner end of the shaft 86 (Fig. 5) which is also provided with an enlarged portion 92 at the inner end of its bearing in the bracket 64. The reduced portion 91 of the shaft may be staked to the arm to provide a rigid connection between the parts. Slightly beyond the outer end of the bearing the shaft is reduced at 93 to provide a shoulder 94, the shaft being threaded at its outer end. An adjustment hand wheel 95 is provided having a central opening suitable to permit the wheel to be mounted over the threaded portion of the shaft in engagement with the shoulder 94, a nut 96 serving to clamp the wheel against the shoulder 94 and thereby secure it to the shaft. To provide a suitable amount of rotational friction to the hand wheel, I employ a cup-shaped washer 97, preferably of the Belleville type, which is compressed by the nut 96 between the frame 64 and the adjacent face of the wheel 95, thereby providing means for restraining the shaft against axial movement and for holding the wheel at the rotary adjustment selected.

Means for positioning the flapper 14 in respect to the orifice 55 of the nozzle is provided by the inner gimbal 61 which engages an extension 100 on the outer end of the flapper (see Fig. 3) and functions to vary its position in respect to the orifice on a basis which is the resultant of the combined rotary movements of the gimbals. The inner gimbal is provided with an annular inwardly extending flange 101 having a laterally extending lip 102 which is engaged by the flapper extension 100, that portion of the lip which is engaged by the flapper being in a plane which is in substantial coincidence with the gimbal axes X—X and Y—Y when the two gimbals are disposed in the same plane. Thus the movements imparted to the inner gimbal 61 by the spiral coil 11 and by the outer gimbal 60, in response to the action of the bellows 12, combine to position the flapper in respect to the nozzle. And by means of the arrangement just described the pivotal mounting 89 of the flapper may be rotated to any selected radial position about the nozzle axis, thereby providing various forms of action and adjustment as will be pointed out. Moreover since the flapper and gimbals are all in the same plane when the output pressure is at the midpoint of its range, the hand adjustment wheel 95 may be rotated to any selected radial position without disturbing the value of the output pressure.

In visualizing the operation of the device embodying this invention it will be of assistance to refer to the diagrammatic views shown in Figs. 7–12, inclusive, wherein the circle described by the ring of the inner gimbal 61 is divided by the intersection of the axes X—X and Y—Y into four quadrants or zones each representing a quarter section of the circle. The quadrant labeled DP in the device herein illustrated is a direct acting proportional zone, that labeled RP a reverse acting proportional zone, that indicated by DS a direct snap acting zone, and that indicated by RS a reverse snap acting zone. It will be understood by those skilled in the art that the overall movement of the flapper 14 in providing proportional control is on the order of .001″ and that the positions assumed by the flapper illustrated diagrammatically in Figs. 8 and 9 and in Figs. 10 and 11 when the flapper is positioned in the DP zone and in the RP zone, respectively, are greatly exaggerated in order to clarify the various motions to be described.

Referring to the operation of the device, when the flapper is radially positioned in zone DP, as shown in full lines in Fig. 7, an increase in the temperature of the controlled process above the control setting unwinds the coil 11, turns arm 22 counterclockwise as viewed in Fig. 1, and rotates the inner gimbal 61 about its pivots 66 proportionally in a clockwise direction as viewed in Figs. 1 and 8 and into the position, for example, shown in Fig. 8. This permits the flapper 14 to be turned on its pivot 89 by the spring 90 causing the inner end of the flapper to approach the nozzle orifice. This movement of the flapper results in an increase of output pressure to which the diaphragm 42 of the regulating valve and the bellows 12 of the secondary response are subjected by means of the communicating pipes 48 and 46. The increase of output pressure causes the bellows 12 to expand and rotate the outer gimbal 60 about its pivots 62 in a clockwise direction as viewed in Fig. 2 and in the direction of the arrow a in Fig. 9. This causes the inner gimbal to move the flapper away from the nozzle orifice as shown in Fig. 9 and return the flapper to a throttling position at an increase of output pressure, which increase is proportional to the increase in variable value above the control setting. The regulating valve member 41 moves proportionally towards closed position, thereby reducing fluid flow through the pipe 17 and tending to return the value of the variable towards the control setting. On a decrease in the temperature of the controlled process the opposite occurs.

The combined movements providing the control action just described may be visualized by regarding the longitudinal axis of the flapper, represented by the dot-and-dash lines 105 (see Fig. 7), as substantially the axis about which the inner gimbal 61 rotates as a result of the combined movements referred to. This will be understood when it is noted, as hereinabove set forth, that the flapper motion required to throttle the nozzle is negligible (approximately .001") and therefor the flapper axis is substantially fixed at each radial position on a line which connects the point of engagement of the flapper extension 100 with the flange 102 of the inner gimbal ring and with the center of the gimbal system. When the flapper is rotated to a position at which its axis is coincident with the axis X—X of the inner gimbal, a change in condition value does not affect the flapper position and therefor there is no change in output pressure and no motions are combined to produce a resultant movement. On the other hand, when the flapper axis is in coincidence with the axis Y—Y, a maximum effect on the position of the flapper is obtained by the rotary motion of the inner gimbal 61, and since the rotary movement of the outer gimbal about its axis Y—Y does not affect the flapper position, no combined motions are provided to produce a resultant movement. However at any radial position of the flapper axis 105 in the quadrant DP between the axes X—X and Y—Y, combined motions of the gimbals occur which provide a resultant movement characterized by the relative effect produced by the motion of one gimbal in respect to the other, and this relative effect is proportional to and may be measured by the degrees in the angle included by the axis Y—Y and the flapper axis 105. This may be more readily visualized by regarding the inner gimbal as a disc forming a plane which initially starts, for example, to rotate in a clockwise direction (viewed in Figs. 1 and 8) about its axis X—X to cause the flapper to approach the nozzle, but by reason of the rotation of the outer gimbal about its axis Y—Y in the direction of the arrow a as viewed in Fig. 9, is inclined in a direction to cause the flapper to recede from the nozzle as indicated in that figure. Thus while the rotational axis of the disc varies sufficiently during these combined actions to effect the result just noted, since the movement required of the flapper is infinitesimal, the rotation of the disc may be said to be substantially around the flapper axis 105. And it will be clear that as the angle defined by the axis Y—Y and the flapper axis 105 is increased, the sensitivity of the controller is decreased, in other words, the proportioning band is widened, and vice versa, and that the width of the proportioning band is proportional to the angle selected.

It will be understood that the total angular motion of the gimbals is relatively small, namely, of the order of 15°, and since both gimbals are in a plane normal to the axis of the shaft 86 at mid-output pressure, the total angular motion of the gimbals is of the order of 7½° plus and minus from this plane. Thus errors due to angularity are minimized insuring substantially linear proportionality between the output pressure and the primary response motion.

In this connection, when the motion imparted by the inner gimbal to the flapper in respect to the motion imparted to the flapper by the outer gimbal is at a ratio of 1 to 1, a 100% proportioning band is obtained at a 45° angle between the axis Y—Y and the flapper axis 105. By means of gradually increasing angles, the band percentage may be increased to infinity. However since the more useable part of the proportioning band adjustment is within the 100% range, and the indexes must be relatively narrowly spaced within the 45° angle, a somewhat higher ratio is more practical to employ, for example a 2 to 1 ratio of inner gimbal movement to outer gimbal movement. By this ratio of two of primary motion to one of feed back motion a 50% band is provided at a 45° angle and by increasing the angle the band percentage may be increased to infinity. Thus ample index spacing may be provided to enable the operator to set the adjustment accurately at the exact proportionality setting desired. For this purpose the outer annular surface of the adjustment wheel 95 is provided with a scale 106 including indexes, preferably in terms of percentage of the total range of coil 11, which cooperate with a fixed pointer 107 mounted on the gimbal frame 64. It will be understood from this description and from the description to follow relating to the control actions obtained by the remaining three quadrants that the scale 106 includes four sets of similar index markings, one for each quadrant.

It may be desirable to provide reverse proportional action, that is the output pressure should decrease proportionally with an increase in variable value, and vice versa, as when a reverse acting regulating valve is used to vary the value of the process under control, or the process is such that a direct acting valve should open when the process value exceeds the control setting. This action may be readily obtained by rotating the flapper from the DP quadrant to the RP quadrant as shown in dotted lines in Fig. 7, and positioning it at some selected radial setting between the axis X—X and the axis Y—Y.

Assuming that a reverse acting regulating valve is used to control the process temperature instead of the direct acting regulating valve 16, that is a valve which closes on a reduction in diaphragm pressure, with the flapper adjusted in the RP quadrant shown in dotted lines in Fig. 7, an increase of temperature above the controlled setting swings coil arm 22 counterclockwise (viewed in Fig. 1), turning inner gimbal 61 clockwise (viewed in Figs. 1 and 10) about its pivots 66. Since the flapper engages the inner gimbal at the opposite side of the axis X—X from that at which the inner gimbal is engaged by the flapper when in the DP quadrant, the flapper is moved away from the nozzle orifice as indicated in Fig. 10 to reduce the output pressure. The bellows 12 therefor contracts permitting the outer gimbal 60 to be rotated by the spring 82 in a counterclockwise direction (viewed in Fig. 2) and in the direction of the arrow b in Fig. 11. Since the flapper is at the opposite side of axis Y—Y from the gimbal actuating arm 81, as is also the case when the flapper is in the DP quadrant, the flapper is permitted to rotate about its pivot 89 toward the nozzle 15 as shown in Fig. 11 to return the control couple to a throttling relation at a lower output pressure. Thus a reduction in output pressure is provided which is proportional to the increase in process temperature. The reverse acting regulating valve therefor closes proportionally to lower the temperature of the controlled process. On a decrease in temperature of the controlled process the opposite occurs.

Again considering these combined actions by visualizing the inner gimbal 61 as a disc, the disc is first rotated clockwise (viewed in Fig. 10) about its axis X—X by the primary response and immediately thereafter is rotated in the direction indicated by the arrow b (see Fig. 11) about axis Y—Y by the secondary response. Thus the initial flapper movement tends to produce a maximum reduction in output pressure but the follow-up movement returns the flapper to a throttling relation at a reduction in pressure which is proportional to the increase in temperature of the controlled process above the control setting. And it will be understood that the width of the proportioning band depends on the number of degrees included in the angle defined by the axis Y—Y and the flapper axis 105. Thus, as when the flapper is disposed in the quadrant DP, while the rotational axis of the disc varies sufficiently during these combined actions to effect the result just noted, since the movements required of the flapper are infinitesimal, the rotation of the disc may be said to be substantially around the flapper axis 105.

It may be desirable to provide a so-called snap action type of control wherein the value of the controlled variable departs a predetermined equal amount on either side of the index setting before the regulating valve is actuated, and when actuated the regulating valve is required to be operated throughout its entire stroke. And in this connection means must be provided to effect either direct snap action or reverse snap action, as may be required to meet the control conditions, and in association therewith means for varying the spread in variable value change required to actuate the regulating valve in either sense.

Referring to Fig. 12, when direct snap action is desired, the flapper 14 is rotated to a selected position in the quadrant labeled DS, for example, as indicated in full lines. It may be assumed that the controled variable is temperature, that the thermal system, a portion of which is illustrated by the Bourdon coil 11, has a range of 0 to 100° F., that the control setting is at 50° F, as determined by the scale 26, and that the scale 106 on the wheel 95 is rotated to a position at which the indicator 107 shows a differential of 20% of the total temperature range, namely, 20° F. When the temperature is at 40° F. the coil arm 22 will be swung to the left (see Fig. 1), the inner gimbal 61 will be rotated counterclockwise (viewed in Fig. 1) to raise the flapper from the nozzle orifice, and by reason of the reduction in output pressure to zero p. s. i., the outer gimbal 60 has also been rotated counterclockwise (viewed in Fig. 2) and has spaced the flapper from the nozzle by an amount determined by the differential setting provided by the adjustment wheel 95. The regulating valve 16 will then be wide open. Under these conditions as the controlled temperature rises, the coil arm 22 swings to the right and turns inner gimbal 61 clockwise (viewed in Fig. 1) and when the temperature reaches 60° F., the flapper starts to build up the output pressure. When this occurs, the bellows 12 expands and swings the outer gimbal 60 clockwise (viewed in Fig. 2) and as viewed from above in Fig. 3, and since the flapper 14, when in the DS quadrant, is at the opposite side of axis Y—Y from that at which the flapper is positioned when in the DP quadrant, the combined effective movement of the gimbals is in the same direction. Therefor the flapper completely closes the nozzle and provides a maximum output pressure, namely, the pressure obtaining in supply pipe 54, thereby closing the regulating valve. When the flapper comes to rest against the nozzle, the inner gimbal becomes disengaged from the flapper extension 100 and is spaced therefrom by an amount which depends on the differential setting provided by the adjustment wheel 95. With the regulating valve closed, the temperature starts to drop and when it arrives at 40° F., the inner gimbal has been rotated counterclockwise (viewed in Fig. 1) to a point at which it engages the extension 100 of the flapper and starts to reduce the output pressure. The bellows 12 contracts turning the outer gimbal counterclockwise (viewed in Fig. 2) to reduce the output pressure to zero p. s. i., the flapper being moved away from the nozzle beyond its throttling range of movement by an amount which depends on the differential adjustment provided by the wheel 95. The regulating valve 16 is thus again opened wide, the temperature again starts to rise and the cycle is repeated.

When the flapper is rotated to a corresponding differential setting in the RS quadrant, as shown in dotted lines in Fig. 12, the device functions on the same basis as in the DS zone but in the reverse sense. Thus when the controlled temperature is at 40° F. a maximum output pressure will be provided and if a reverse acting regulator is used, the regulator will be in wide open position and will remain in that position until the temperature reaches 60° F. When this occurs the output pressure will be reduced to zero p. s. i. and the regulator will be closed and will remain closed until the temperature again drops to 40° F., whereupon the pressure will again be increased to maximum, the regulator will be opened wide and the cycle will be repeated.

In connection with the direct acting or reverse acting snap action control just described, it may be pointed out that the resultant rotational movement of the inner gimbal effected by the combined rotary movements of both gimbals is not substantially around the axis 105 of the flapper as in the case where proportional control action is provided. This is due to the fact that in either quadrant DS or quadrant RS the flapper movement initiated by the inner gimbal is followed up by an additional flapper movement in the same direction effected by the outer gimbal.

In order that adjustment may be made in any of the four quadrants without accidentally rotating the flapper to a different quadrant, I provide the wheel with four detents 108, one at the juncture of each two adjacent quadrants, which make a frictional engagement with the pointer 107 previously referred to. Thus while the operator can rotate the flapper from one quadrant to another by exercising a small amount of additional force in turning the wheel, he will be apprised of the quadrant limits when making an adjustment in any one quadrant.

It will be understood by those skilled in the art that the feed back action provided by the bellows 12 to obtain proportional control may be modified in the usual manner to obtain reset and/or derivative control action without departing from the scope of this invention.

While I have shown and described in detail a preferred form of apparatus embodying this invention, I wish it to be understood that modifications may be employed without departing from the spirit and scope of my invention.

What I claim as new, and desire to secure by Letters Patent of the United States is:

1. In a control apparatus having a fluid pressure system, a source of fluid pressure therefore, and a valve for varying the pressure in the system, a primary element responsive to changes in the value of a variable, a secondary element responsive to pressure changes in the system, a support, a first gimbal pivotally mounted on the support, a second gimbal pivotally mounted on the first gimbal, the axes of said pivotal mountings intersecting, means for rotating one of said gimbals by said primary element, means for rotating the other of said gimbals by said secondary element, and means operatively connecting said second gimbal with said valve.

2. In a control apparatus having a fluid pressure system, a source of fluid pressure therefore, and a nozzle connected with said system, a primary element responsive to changes in the value of a variable, a secondary element responsive to pressure changes in the system, a support, a first gimbal pivotally mounted on the support, a second gimbal pivotally mounted on the first gimbal, the axes of said pivotal mountings intersecting, means for rotating one of said gimbals by said primary element, means for rotating the other of said gimbals by said secondary element, and a flapper actuated by said second gimbal in respect to said nozzle for varying the pressure in the system.

3. In a control apparatus having a fluid pressure system, a source of fluid pressure therefore, and a valve for varying the pressure in the system, a primary element responsive to changes in the value of a variable, a secondary element responsive to pressure changes in the system, a support, a first gimbal pivotally mounted on the support, a second gimbal pivotally mounted on the first gimbal, the axis of one of said gimbals being normal to and intersecting the axis of the other of said gimbals, means for rotating one of said gimbals by said primary element, means for rotating the other of said gimbals by said secondary element, and means operatively connecting said second gimbal with said valve.

4. In a control apparatus having a fluid pressure system, a source of fluid pressure therefore, and a valve for varying the pressure in the system, a primary element responsive to changes in the value of a variable, a secondary element responsive to pressure changes in the system, a support, a first gimbal pivotally mounted on the support, a second gimbal pivotally mounted on the first gimbal, the axes of said pivotal mountings intersecting, one of said elements being in operative connection with said first gimbal, the other of said elements being in operative connection with said second gimbal at the axis of the first gimbal when both gimbals are in the same plane, and means operatively connecting said second gimbal with said valve.

5. In a control apparatus having a fluid pressure system, a source of fluid pressure therefore, and a valve for varying the pressure in the system, a primary element responsive to changes in the value of a variable, a secondary element responsive to pressure changes in the system, a support, a first gimbal pivotally mounted on the support, a second gimbal pivotally mounted on the first gimbal, the axes of said pivotal mountings intersecting, one of said elements being in operative connection with said first gimbal, the other of said elements having a connection with said second gimbal centered at the axis of the first gimbal when both gimbals are in the same plane, and means operatively connecting said valve with said second gimbal at a point within a plane defined by the axis of the second gimbal and by the center of the connection of said second gimbal with the said other element.

6. In a control apparatus having a fluid pressure system, a source of fluid pressure therefore, and a valve for varying the pressure in the system, a primary element responsive to changes in the value of a variable, a secondary element responsive to pressure changes in the system, a support, a first gimbal pivotally mounted on the support, a second gimbal pivotally mounted on the first gimbal, the axes of said pivotal mountings intersecting, one of said elements being in operative connection with said first gimbal, the other of said elements having a connection with said second gimbal centered at the axis of the first gimbal when both gimbals are in the same plane, and means adjustable substantially about the intersection of said axes operatively connecting said valve with said second gimbal at selected points within a plane defined by the axis of the second gimbal and by the center of the connection of said second gimbal with the said other element.

7. In a control apparatus having a fluid pressure system, a source of fluid pressure therefore, and a valve for varying the pressure in the system, a primary element responsive to changes in the value of a variable, a secondary element responsive to pressure changes in the system, a support, a first gimbal pivotally mounted on the support, a second gimbal pivotally mounted on the first gimbal, the axes of said pivotal mountings intersecting, means for rotating one of said gimbals by said primary element, means for rotating the other of said gimbals by said secondary element, and means disposed in spaced relation with the intersection of said axes operatively connecting said second gimbal with said valve.

8. In a control apparatus having a fluid pressure system, a source of fluid pressure therefore, and a valve for varying the pressure in the system, a primary element responsive to changes in the value of a variable, a secondary element responsive to pressure changes in the system, a support, a first gimbal pivotally mounted on the support, a second gimbal pivotally mounted on the first gimbal, the axes of said pivotal mountings intersecting, means for rotating one of said gimbals by said primary element, means for rotating the other of said gimbals by said secondary element, and means disposed in spaced relation with the intersection of said axes operatively connecting said second gimbal with said valve, said means being adjustable substantially about the said intersection to vary the effective action of said gimbals.

9. In a control apparatus including a fluid pressure system, a primary element responsive to changes in the value of a variable, a secondary element responsive to changes in fluid pressure in the system, a support, a first gimbal pivotally mounted on the support, a second gimbal pivotally mounted on the first gimbal, the pivotal axes of said gimbals intersecting, means for rotating one of said gimbals by said primary element, means for rotating the other of said gimbals by said secondary element, a nozzle member having a source of fluid pressure and connected with said fluid pressure system, a flapper member, at least one of said members being movable in respect to the other, a pivotal mounting for said movable member disposed in spaced relation with the intersection of said axes, said members cooperating at one side of said pivotal mounting to vary the pressure in the system, and means disposed at the other side of said pivotal mounting operatively connecting said movable member with said second gimbal.

10. In a control apparatus including a fluid pressure system, a primary element responsive to changes in the value of a variable, a secondary element responsive to changes in fluid pressure in the system, a support, a first gimbal pivotally mounted on the support, a second gimbal pivotally mounted on the first gimbal, the pivotal axes of the gimbals intersecting, means for rotating one of said gimbals by said primary element, means for rotating the other of said gimbals by said secondary element, a nozzle member having a source of fluid pressure and connected with said fluid pressure system, a flapper member, at least one of said members being movable in respect to the other, a pivotal mounting for said movable member disposed in spaced relation with the intersection of said axes, said members cooperating at one side of said pivotal mounting to vary the pressure in the system, and means disposed at the other side of said pivotal mounting operatively connecting said movable member with said second gimbal, said pivotal mounting being adjustable about said intersection to vary the effective action of said gimbals.

11. In a control apparatus including a fluid pressure system, a primary element responsive to changes in the value of a variable, a secondary element responsive to changes in fluid pressure in the system, a support, a first gimbal pivotally mounted on said support, a second gimbal pivotally mounted on said first gimbal, the pivotal axes of the gimbals intersecting, means for rotating one of said gimbals by said primary element, means for rotating the other of said gimbals by said secondary element, a nozzle member having a source of fluid pressure and connected with said fluid pressure system, a flapper member, at least one of said members being movable in respect to the other to vary the pressure in the system, and means operatively connecting said movable member with said second gimbal substantially at the periphery thereof to vary the pressure in the system, said means being adjustable to various positions on said periphery to vary the effective action of said gimbals.

12. In a control apparatus including a fluid pressure system having a source of fluid pressure, a primary element responsive to changes in the value of a variable, a secondary element responsive to changes in fluid pressure in the system, a support, a first gimbal pivotally mounted on said support, a second gimbal pivotally mounted on said first gimbal, the pivotal axes of the gimbals intersecting and the planes of said gimbals being in substantial coincidence at a selected pressure in the system, means for rotating one of said gimbals by said primary element, means for rotating the other of said gimbals by said secondary element, a nozzle member connected with the fluid pressure system, a flapper member, at least one of said members being movable in respect to the other to vary the pressure in the system, said movable member being rotatable about an axis normal to the planes of said gimbals when said planes are in coincidence at said selected output pressure and being adapted to be engaged by said second gimbal to vary the pressure in the system, and means for rotating said movable member to selected positions in respect to the said gimbal axes.

13. In a control apparatus including a fluid pressure system having a source of fluid pressure, a primary element responsive to changes in the value of a variable, a secondary element responsive to changes in fluid pressure in the system, a support, a first gimbal pivotally mounted on said support, a second gimbal pivotally mounted on said first gimbal, the pivotal axes of the gimbals intersecting and the planes of said gimbals being in substantial coincidence at a selected pressure in said system, means for rotating one of the said gimbals by the primary element, means for rotating the other of said gimbals by the secondary element, a nozzle mounted adjacent the intersection of said pivotal axes and connected with the fluid pressure system, a pivotally mounted flapper adapted to cooperate with said nozzle to vary the pressure in the system, said flapper being rotatable about the intersection of said gimbal axes and being engageable by said second gimbal to vary the pressure in the system, and means for rotating said flapper to selected positions in respect to said gimbal axes.

14. In a control apparatus including a fluid pressure system, a primary element responsive to changes in the value of a variable, a secondary element responsive to pressure changes in the system, a support, a first gimbal pivotally mounted on the support, a second gimbal pivotally mounted on the first gimbal, the axes of said gimbals intersecting within the gimbals and the planes of said gimbals being in substantial coincidence at a selected pressure in the system, means for rotating one of said gimbals by the primary element, means for rotating the other of said gimbals by the secondary element, a nozzle member having a source of fluid pressure and connected with the fluid pressure system, a flapper member, at least one of said members being movable in respect to the other to vary the pressure in the system, a rotatable shaft on which said movable member is mounted having an axis substantially intersecting said gimbal axes at their point of intersection and substantially normal thereto when the planes of said gimbals are in coincidence, said movable member being rotatable with said shaft and the axis of said nozzle being in substantial coincidence with the axis of said shaft at least when said nozzle and flapper members are in engagement, and means spaced from the axis of said shaft operatively connecting said movable member with said second gimbal.

15. In a control apparatus including a fluid pressure system, a primary element responsive to changes in the value of a variable, a secondary element responsive to changes in pressure in the system, a first gimbal pivotally mounted on a support, a second gimbal pivotally mounted on the first gimbal, the axes of said gimbals intersecting and the planes of the gimbals being in substantial coincidence at a selected pressure in the system, means for rotating one of said gimbals by the primary element, means for rotating the other of said gimbals by the secondary element, a rotatably mounted shaft having an axis substantially normal to the planes of the gimbals when said planes are in coincidence, said shaft axis intersecting the plane of said gimbals substantially at the point of intersection of the gimbal axes, a flapper pivotally connected with said shaft at a selected spacing from the shaft axis, a nozzle having a source of fluid pressure and connected with the fluid pressure system, said nozzle being substantially in axial alignment with said shaft and cooperating with the flapper at one side of the flapper pivotal mounting to vary the pressure in the system, and means disposed at the other side of said pivotal mounting operatively connecting said flapper with said second gimbal.

16. In a control apparatus including a fluid pressure system, a primary element responsive to changes in the value of a variable, a secondary element responsive to changes of pressure in the system, a first gimbal pivotally mounted on a support, a second gimbal pivotally mounted on the first gimbal, the axes of said gimbals intersecting within the gimbals to divide said second gimbal into four zones of adjustment and the planes of the gimbals being in substantial coincidence at a selected pressure in the system, means for rotating one of said gimbals by the primary element, means for rotating the other of said gimbals by the secondary element, a nozzle having a source of fluid pressure and connected with the fluid pressure system, said nozzle being mounted adjacent the intersection of said pivotal axes, a rotatably mounted shaft having an axis substantially normal to the planes of the gimbals when said planes are in coincidence, said shaft axis intersecting the plane of said gimbals substantially at the point of intersection of the gimbal axes, a flapper pivotally mounted on said shaft at a selected spacing from the shaft axis and having a longitudinal axis disposed in radial relation with the axis of said shaft and substantially in parallel with the planes of said gimbals when said planes are in coincidence, said flapper cooperating with the nozzle at one side of its pivotal mounting and adapted for engagement by the second gimbal at the other side of said pivotal mounting to vary the pressure in the system, and said flapper being rotatable by said shaft into said four zones of adjustment to provide direct and reverse proportional action and direct and reverse snap action, the adjustments provided in the proportional action zones and in the snap action zones being proportional to the angle defined by the flapper axis and a pivotal axis of said gimbals.

17. In apparatus having a fluid pressure system, a source of fluid pressure therefore, and a valve for varying the pressure in the system, means for converting a change in the value of a variable to a proportional change in fluid pressure in the system, comprising, a primary element responsive to changes in the value of a variable, a secondary element responsive to pressure changes in the system, a support, a first gimbal pivotally mounted on the support, a second gimbal pivotally mounted on the first gimbal, the axes of said pivotal mountings intersecting, means for rotating one of said gimbals by said primary element, means for rotating the other of said gimbals by said secondary element, and means operatively connecting said second gimbal with said valve.

JOHN W. ROBINS.

REFERENCES CITED

The following references are of record in the file of this patent:

UNITED STATES PATENTS

| Number | Name | Date |
|---|---|---|
| 2,296,714 | Ibbott | Sept. 22, 1942 |
| 2,427,235 | Smoot | Sept. 9, 1947 |